3,375,209
POROUS FILM AND METHOD OF MAKING
Charles R. Kemper, 500 Canterbury Drive,
Dayton, Ohio 45429
No Drawing. Filed May 25, 1964, Ser. No. 370,048
5 Claims. (Cl. 260—2.5)

ABSTRACT OF THE DISCLOSURE

Breathable polyvinyl chloride sheets are formed from a plastisol mixture of polyvinyl chloride and a plasticizer, having dispersed therethrough particulate sodium tetraborate decahydrate (borax) capable of passing through a 100 U.S. standard mesh screen. The plastisol mixture is formed into sheets and thereafter heated to between 300° F. and 400° F. for release of water of hydration from the borax which forms small channels through the sheet as the latter is being cured. The cured sheet is then treated with water to leach out the anhydrous borax thus leaving a vapor permeable polyvinyl chloride sheet.

---

This invention relates to plastic film or sheets and the like, and more particularly it relates to a method of obtaining a flexible vapor permeable sheet of polyvinyl chloride, and to the product of such method. This invention relates more particularly to a polyvinyl chloride material formed by heating a plastisol to an elevated temperature of about 300° F. to 400° F. The plasticizer such as Union Carbide & Chemicals Company Flexol 380 may be used with powdered resin such as Exon 654 of Firestone Tire & Rubber Company in about equal proportions by weight or with the resin up to 200% of the weight of the plasticizer.

One object of the invention is the provision of a novel method of making a porous plastic sheet of polyvinyl chloride where interconnected pores are provided by crystalline borax.

A further object of the invention is the method of making a flexible thin sheet of polyvinyl chloride having significant tensile strength and elasticity, in which water soluble crystals of borax present in the mixture treated are trapped or encapsulated in the plastisol before the thermo-setting or fusing temperature is obtained, and then during the heating process water of crystallization from the borax crystals is released and vaporized to provide open pores and form tiny intercommunicating channels between the various salt containing chambers.

A further object resides in the method of making a sheet of this character from a plastisol containing about 5 to 20% pore forming water soluble crystals, substantially all of which is borax.

Another object of the invention resides in the provision of a novel polyvinyl chloride sheet or film having vapor permeability and the method of making the same, possessing the advantageous features and the means and modes of procedure hereinafter described.

With the above and other incidental objects in view as will be more fully apparent from the specification, the invention intended to be protected by Letters Patent consists of the features and arrangements and combinations as hereinafter described, or their equivalent.

The type of material with which this application is concerned is a polyvinyl chloride compound. The resin may be in the form of a fine powder thoroughly mixed in a plasticizer to form a liquid suspension or plastisol mixture or dispersion. The plasticizer ordinarily employed with resins of this type of material usually results in a mixture with a gelling point at a temperature of about 170° F. although this temperature is not clearly defined and may have somewhat of a range especially in view of the different kinds of plasticizing agents that may be employed.

Ordinarily, too, this type of resinous material would be cured or fused at a temperature of about 350° F.

Attempts have been made to provide open cells, chambers of air or gas, in polyvinyl chloride compounds by means of nitrogen emitting blowing agents but the past processes do not provide a satisfactory surface and are very critical because once the gas chambers are formed by the generated gases there is an immediate tendency for the chambers to collapse or to combine to form large bubbles if the chambers are in communication with each other.

In accordance with the present invention the plastisol has added to it a quantity of water soluble finely divided borax. The amount of borax added is about 5% to 20% by weight of the weight of the plastisol. The resin may be a homopolymer or a copolymer of vinyl chloride, the term polyvinyl chloride here including copolymers of vinyl chloride with other vinyl resins. Exon 654 of Firestone Tire & Rubber Company has been found to be very satisfactory for this purpose. The plasticizer employed may be one suitable for use with this type of resin. Union Carbide and Chemicals' Flexol 380 has been found to be very satisfactory. The proportions of resin powder to plasticizing agent should be from about 10 to 10 to about 10 to 8 or less, varying in dependence on characteristics desired.

It has been found that by using an adequate amount of crystalline sodium tetraborate, or borax containing water of crystallization as the pore forming agent, tiny increments of water are liberated from the borax during the gelling stage and prior to the fusing or setting temperature. This water liberation does not start until after the heating or curing stage has been started. Sodium tetraborate dacahydrate ($NA_2B_4O_7 \cdot 10H_2O$) is the preferred salt. The water of crystallization is given up at a temperature well in excess of 140° F. and well below the fusing temperature of the vinyl resin and vaporized at about the boiling point of water and well below the fusing or setting temperature of the polyvinyl chloride and is supplied in the form of exceedingly tiny increments from the tiny dispersed particles of borax well distributed throughout the plastisol. The steam generated forms tiny channels of communication between the chambers containing the borax crystals and tiny channels to the outer surfaces of the material. The time in which the water of crystallization can act on the plastisol is very limited, only a matter of a minute or so, so the water does not have the degrading effect that would be produced if any substantial amount of water were present for any substantial time period.

Although crystalline sodium tetraborate used in amounts up to about 20% of the weight of the plastisol may constitute the entire blowing agent, it is preferred to employ small amounts of sodium bicarbonate as a neutralizer. It has been found the steam generated by the distributed borax crystals forms passages between the chambers containing the borax and the chambers containing the sodium bicarbonate so that after curing or fusing of the resin the leaching water can have access to the sodium bicarbonate crystals to dissolve them as well as the remaining sodium tetraborate. Such a process is particularly adaptable to fabric reinforced sheets of a total thickness of about 1/16 inch. With such rather thin sheets the water of crystallization released from the borax will promptly pass to the outside of the sheet and not affect the strength of the sheet. By employing sodium bicarbonate in very small amounts with a much greater quantity of borax, the outer surface of the finished product is somewhat improved.

The crystals of borax after heating will remain as anhydrous sodium tetraborate following the release of the water of crystallization. The entire time for the heating process is only about 2 or 3 minutes. The temperature used is about 350° F. although temperatures as high as 400° or as low as 300° are practical. After the heating phase the sheet is carried through a water bath where the salts are leached out. The water bath is preferably provided with a series of pressure rollers between which the sheet passes to aid in the leaching process.

The relative amount of crystalline borax employed in the plastisol will vary depending upon the type of material desired but to give an air permeable product that will slowly transmit water the amount of borax should be about 5% to 25% and preferably about 15% to 20% of the complete mixture which may also include about 2 to 4% sodium bicarbonate. If a greater proportion of air voids is desired the amount of borax can be increased.

The following specific examples are intended as illustrations of my invention and not as limitations thereof. For example the following combinations were prepared by mixing the ingredients as follows:

|  | Examples | | | |
| --- | --- | --- | --- | --- |
|  | 1 | 2 | 3 | 4 |
|  | Parts by Weight in Percent | | | |
| Polyvinyl Chloride Resin | 42 | 42 | 50 | 59 |
| Plasticizer | 33 | 35 | 38 | 35 |
| Borax | 21 | 19 | 11 | 5 |
| Sodium Bicarbonate | 4 | 4 | 2 | 1 |

The plasticizer in examples 1 to 3 was Flexol 380 and the resin was Exon 654. Monsanto's 440 resin was used in example 4 with a mixture of Flexol 380 and dioctyl phthalate. Example 4 had less porosity but its surface was tougher. The borax was in the form of fine powder most of which could pass through a 100 U.S. standard mesh screen. The sodium chloride crystals were also small enough so that most of them could pass through a 100 U.S. standard mesh screen. The polyvinyl chloride powder was thoroughly mixed in the plasticizer before adding the borax and sodium bicarbonate which were very thoroughly mixed in the plasticizer. Roller or crush milling of the entire compound during the mixing operation, to insure a more complete dispersion of the crystalline materials, seems to produce a better finished product. Entrained air bubbles are preferably removed by vacuum before pouring the mixture at normal room temperature on a traveling carrier. This carrier may be a carrying belt of metal or other suitable material from which the heated sheet is later released. The sheet is then passed on the carrier through the heating zone where it is subjected to heat of about 300° F. to 400° F. for a few minutes depending upon the thickness of the sheet. During the heating process as previously explained the water of crystallization in the borax is driven off and then vaporized after the gelling phase to create a series of interconnecting cells in the final product. These cells range in size from a few microns to a few thousandths of an inch. These tiny pores are so numerous that the apparent density of the product is about 75%. The collapse of these cells produced during the heating stage is prevented because of the salt crystals themselves. The hot water then leaches the soluble residues from the product after the curing stage is completed. The tiny interconnecting channels between the cells extend from surface to surface in an incoherent manner and permits this leaching process to an effective degree so that substantially all the water soluble salt is quickly removed.

For some purposes the porous sheet may be made entirely from the plastisol but it is preferred to provide adequate strength an open weave sheet of fabric of cotton, nylon, rayon or other suitable flexible material may be incorporated in the product. This fabric sheet may be applied to the traveling belt or carrier and the resinous mixture spread upon it or it may be added at the top of the resinous layer. It may be of advantage to finish the material as an unsupported film and then cement to the desired substrate. Where the material of the fabric is one that is effected by high heat the curing temperature used may be about 300° F.

In the examples the sheets were soft to the touch and air and water permeable with pores throughout and in communication with both outer surfaces. The lower sides which rested on the carrier were smooth. The upper surfaces were rougher and somewhat tougher. When examined under a microscope the tiny pore openings were quite apparent with no surface roughing treatment. The apparent density generally increased as the borax content employed decreased. The sample having the greatest capability of vapor transmission resulted from the larger content of borax.

It has been found that the borax crystals can be mixed in the plastisol for a long time prior to the time of use. It is not necessary to mix the ingredients and use them immediately as it is in the case of some blowing agents and organosols. The resulting product is stable and the temperatures of treatment and proportions are not exceedingly critical so the process is capable of being very conveniently employed. The resultant product is one that is strong, stable, odorless, flexible and is capable of breathing. It is not a water barrier since it is to some degree water permeable, water would travel through the sheet slowly. It may thus be used where a water repellant characteristic is desired but since it has the capability to breathe, since the pores provided form channels clear from one side of the sheet to the other, the material is particularly satisfactory for use in many places where this characteristic is an advantage, for example, in shoes, upholstery, carpeting, clothing and many other uses.

While the invention has been discussed at length it should be understood that the invention is not limited to the specific features and proportions referred to, but that the method herein disclosed comprises but one of several modes of putting the invention into effect.

Having thus described my invention I claim:

1. The method of producing a flexible porous polyvinyl chloride sheet characterized primarily by the fact that the sheet is vapor permeable, said method comprising the steps of forming a plastisol reaction mixture comprising polyvinyl chloride, a plasticizer, and particulate hydrated sodium tetraborate as the essential ingredients, said hydrated sodium tetraborate being uniformly distributed through said plastisol reaction mixture and containing water of hydration releasable as water vapor upon heating said reaction mixture to a predetermined temperature, forming said reaction mixture into an uncured sheet, heating said uncured sheet at a temperature above said predetermined temperature to effect release of water of hydration and to effect curing of said sheet, said water of hydration forming channels through said sheet whereby a vapor permeable sheet is formed, and thereafter treating the vapor permeable sheet in a water bath to leach the anhydrous sodium tetraborate therefrom.

2. The method as set forth in claim 1 in which said hydrated sodium tetraborate is present in an amount by weight of between 5% and 25%.

3. The method as set forth in claim 2 in which said reaction mixture includes sodium bicarbonate in an amount between 1% and 4% by weight.

4. The method as set forth in claim 2 in which said reaction mixture is heated to a temperature of between 300° F. and 400° F.

5. The method as set forth in claim 1 in which said hydrated sodium tetraborate is of a size sufficiently small to pass through a 100 U.S. standard mesh screen.

References Cited

UNITED STATES PATENTS

| 2,911,382 | 11/1959 | Barkhuff et al. | 260—2.5 |
| 2,984,869 | 5/1961 | Honey et al. | 260—2.5 |

FOREIGN PATENTS

| 649,646 | 1/1951 | Great Britain. |
| 671,786 | 5/1952 | Great Britain. |
| 903,564 | 8/1962 | Great Britain. |

MURRAY TILLMAN, *Primary Examiner.*

S. H. BLECH, *Examiner.*

M. FOELAK, *Assistant Examiner.*